Feb. 10, 1948.  W. A. CURTIS  2,435,675

THERMOSTAT VALVE AND SPRING THEREFOR

Filed June 8, 1946

Inventor:
Walter A. Curtis.
By Brown, Jackson, Boettcher & Dienner,
Attys.

Patented Feb. 10, 1948

2,435,675

UNITED STATES PATENT OFFICE 2,435,675

THERMOSTAT VALVE AND SPRING THEREFOR

Walter A. Curtis, Cleveland, Ohio, assignor to The Bishop & Babcock Manufacturing Company, Cleveland, Ohio, a corporation of Ohio Application June 8, 1946, Serial No. 675,426

7 Claims. (Cl. 236—34)

This invention relates to thermostatic valves, and has to do with thermostatic valves intended for use in controlling the flow of cooling liquid for internal combustion engines, and for analogous purposes.

It is well known to provide thermostatic valves in internal combustion engine cooling systems, such valves opening a passage for the coolant which is circulated, by a pump, through the radiator, when the coolant has reached a predetermined high temperature, at which time the thermostatic valve functions to permit flow of the coolant to and through the radiator. Valves of this type commonly employ a thermostatic bellows as the valve actuating member, this bellows being charged, under partial vacuum, with a suitable thermo-sensitive fluid. When the water or coolant solution of the engine cooling system is at a predetermined low temperature, the bellows is effective for holding the valve closed, assisted if desired by supplementary means urging the valve in closing direction, and when the coolant reaches a higher temperature the bellows expands and urges the valve in opening direction. In the event of breakage or rupture of the bellows, the latter expands, due to its inherent resiliency, and opens the valve a short distance, in the absence of any supplementary means urging the valve in closing direction, the valve being opened a further distance by the pressure of the coolant being forced through the system by the pump and acting upon the valve in opening direction. The bellows is designed to start opening the valve at a predetermined temperature, in the absence of supplementary means urging the valve in closing direction, the valve assembly, including the bellows, being a standard unit which has a start opening temperature of from 158° to 163°, with a full open temperature of approximately 190° F. That is, the bellows will start to open the valve at a temperature of from 158° to 163°, and will move it into full open position at a temperature of 190° F. It is often desirable to delay opening of the valve, so that it will not start opening until the coolant has reached a temperature somewhat higher than the standard start opening temperature referred, and in order to attain that result it is known to provide compression or torsion springs which yieldingly urge the valve in closing direction, supplementing the bellows in that respect. Such a spring will delay the start of opening of the valve until a temperature somewhat higher than the referred to standard temperature has been attained by the coolant, but it will also present increasing resistance to opening of the valve. For example, a coil spring may be used which raises the start opening temperature of the valve to from 165° to 170° F., which is desirable, but due to the increasing resistance offered by such a spring to opening of the valve, the valve would not be fully opened until the coolant reaches a temperature of approximately 205°, which is objectionably high for automotive operations employing the usual types of cooling systems and anti-freeze solutions. Further, if such a spring be used, in the event of rupture of the bellows the valve would not be opened and would tend to remain closed at all times, resulting in the engine operating at objectionably high temperatures under warm weather conditions. Preferably, the valve should be in full open position at a temperature of approximately 190°, as occurs in the use of the standard unit referred to, but that is not attainable when using a coil spring or other yielding means urging the valve in closing direction and presenting increasing resistance to opening thereof throughout the opening movement of the valve, as has been explained.

My invention is directed to thermostatic valve means which avoids the objections to the known thermostatic valve means, above referred to. To that end, I provide means whereby opening of the valve, by means of the thermostatic bellows, or equivalent thermostatic means, is resisted during a portion only of the opening movement of the valve, such resistance being thereafter substantially eliminated, whereby the valve does not start opening until the coolant reaches a somewhat higher temperature than that at which the valve would start opening if such means were not provided, the yielding means, since it becomes ineffective after the valve has been opened to a predetermined extent, as noted, permitting the valve to be moved to its fully opened position at approximately the same high temperature of the coolant at which the valve is fully opened by the thermostatic member or bellows in the absence of the supplementary means urging the valve in closing direction. I attain that result by providing opposed inclined surfaces yieldingly urged toward each other defining a converging passage for a movable member of the valve assembly so that, in the opening movement of the valve, such member contacts such surfaces whereby resistance to opening of the valve is produced, the surfaces being of limited extent such that the movable member passes out of contact therewith after the valve has been moved a predetermined distance in opening direction, thereby substantially eliminating such resistance to opening of the valve which may then be moved to fully opened position by the thermostatic member. More specifically, I provide a thermostatic bellows fixed at one end and having at its other end a head connected to the valve member for opening and closing the latter, in conjunction with spring arms having inclined surfaces converging radially inwardly of the bellows head and normally overlying the latter so that when the bellows expands and the head thereof moves in valve opening direction the inclined surfaces of the arms are contacted by the head and resist such movement thereof, the bellows head passing out of contact with the inclined surfaces after the valve has been opened to a predetermined extent and the valve member being thereafter moved to its fully opened position by the bellows. Preferably, the inclined surfaces of the spring arms normally are in pressure contact with the bellows head so as to urge it in valve closing direction, so that the temperature at which the valve starts to open is somewhat higher than it would be in the absence of the spring arms and the inclined surfaces thereof cooperating with the head of the bellows in the manner stated. The bellows proper is formed of quite thin metal, for example brass of .005 inch thickness and the head of the bellows is formed of much thicker metal. In order to avoid objectionable wear of the thin metal of the body of the bellows, the inclined surfaces referred to are disposed to contact with the bellows head and the latter preferably is provided with ears extending about the top convolution or fold of the bellows body, the inclined surfaces of the spring arms being disposed for contact with the ears of the head. An important feature of my invention is the provision of a multi-armed spring member, conveniently of U-shape, which may be applied to and removed from the valve assembly with expedition and facility, the arms of this member being provided with channel elements which receive the ears of the bellows head and, in cooperation therewith, hold the spring member properly positioned on the valve assembly. Further objects and advantages of my invention will appear from the detail description.

Figure 1:
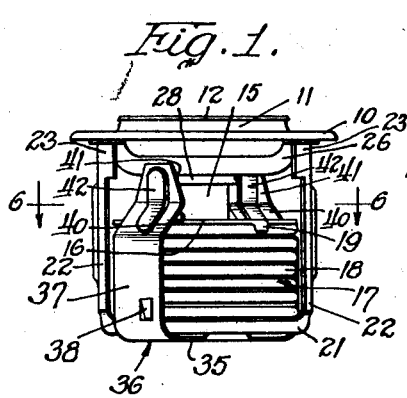
Figure 1 is a side view of a thermostatic valve assembly embodying my invention.
Figure 2:
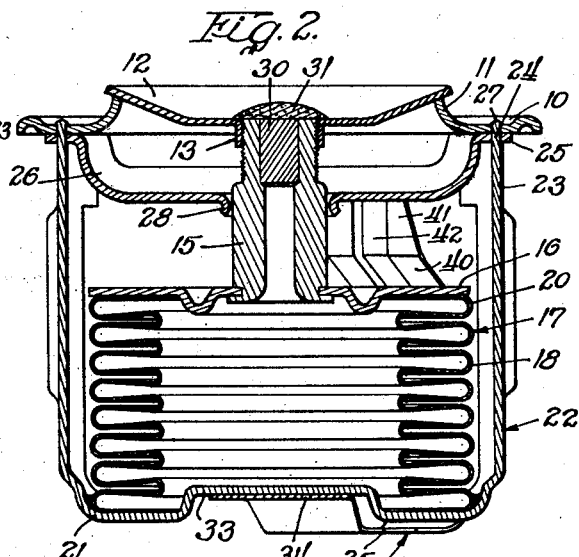
Figure 2 is a vertical sectional view, on an enlarged scale, of the valve assembly of Figure 1, certain parts being shown in elevation.
Figure 3:
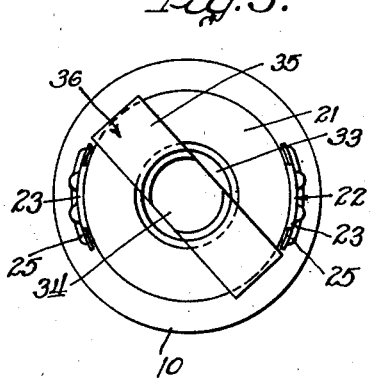
Figure 3 is an underneath view of the valve assembly of Figure 1.

I have illustrated my invention, by way of example, as embodied in a valve assembly comprising an annular valve seat member 10 having an upwardly curved flange 11 providing a seat for a cooperating valve member 12 of generally concavo-convex cross section. The valve member 12 is provided with an interiorly threaded depending neck 13 screwing on the upper end portion of a valve stem 15 suitably secured at its lower end in a head 16 at the upper end of a metal bellows 17. The bellows 17 comprises a body 18 formed of relatively thin metal, for example, brass approximately .005 inch thick, it being noted that head 16 is of much greater thickness than the metal of which the bellows body 18 is formed. The bellows head 16 is provided with suitably spaced ears 19 extending about the top convolution or fold 20 of the bellows body 18, to which head 16 is suitably secured, preferably by soldering or brazing. The lower end of bellows body 18 is closed by an upwardly cupped head 21 at the lower end of a substantially U-shaped frame 22, in which head 21 the lower end of bellows body 18 seats and is secured therein by soldering. Frame 22 comprises two upwardly extending arms 23 disposed at diametrically opposite sides of head 21 and extending upward therefrom along bellows 17, spaced radially outward therefrom. Each of the arms 23 is reduced in width at its upper portion, to provide a tongue or tang 24, which extends through end flanges 25 of a guide yoke 26 of channel cross section extending between arms 23, and through valve seat member 10, the upper ends of the tangs 24 being peened or riveted over at 27. The guide yoke 26 is provided with a central collar 28 through which extends valve stem 15, guided thereby. The valve stem 15 is tubular, as shown in Figure 2, and, after the bellows has been properly charged with a thermosensitive fluid, under partial vacuum, as above stated, is closed by a plug 30 inserted into the upper end of stem 15, this plug and the valve member 12, after the latter has been properly positioned on stem 15, being secured to stem 15 and to each other in a suitable manner, conveniently by soldering as at 31.

The valve assembly so far described is in general of known construction and may be considered as exemplifying a standard valve assembly unit such as that above referred to. When this unit is mounted in the cooling system of an internal combustion engine, in the manner previously described, the valve member 12 is held closed so long as the coolant is at or below a predetermined low temperature, and is opened at a higher temperature, being moved into fully opened position when the coolant has been heated to a predetermined maximum temperature. It may be assumed, for purposes of description, that the valve assembly is so designed that the valve member 12 will start to open at a temperature of from 158° to 163° and will be in fully opened position at a temperature of 190° F. It is desirable under certain conditions, as for winter operation, that the temperature at which the valve starts to open be somewhat higher than that of the standard unit referred to, for example from 165° to 170°, and that the valve be fully opened at the same temperature as in the standard unit, that is, at approximately 190°. In order to attain that result, I provide means whereby opening of the valve is resisted during a portion of the opening movement thereof, and such resistance to opening of the valve is substantially eliminated after it has been opened to a predetermined extent, whereby the valve may then be moved to fully open position by the bellows at substantially the same temperature at which it would be opened to its full extent by the standard unit in the absence of means supplementary to the bellows urging the valve in closing direction.

Figure 4:
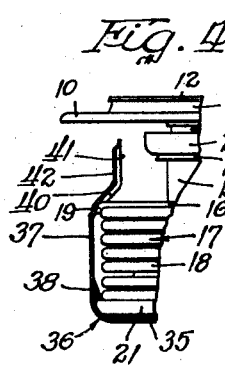
Figure 4 is a fragmentary side view of the valve assembly of Figure 1, with the valve member in closed position and the spring member shown in section.
Figure 5:
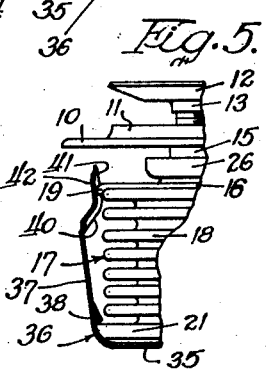
Figure 5 is a view similar to Figure 4 but with the valve member in fully opened position.
Figure 7:
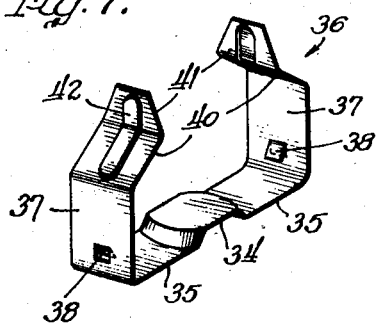
Figure 7 is a detail isometric view of the spring member for presenting yielding resistance to opening of the valve member.
Figure 6:
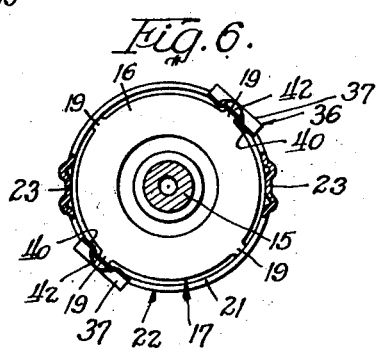
Figure 6 is a sectional view taken substantially on line 6—6 of Figure 1.

While the means for resisting opening of the valve may assume various forms, within the broader aspects of my invention, in its preferred form it comprises a spring member presenting inclined surfaces of limited extent disposed for contact with head 16 of the bellows 17 during movement of head 16 a predetermined distance in valve opening direction, after which such surfaces become substantially ineffective for resisting movement of head 16 in valve opening direction. Head 21 of frame 22 is provided with a central depression 33 which receives an upwardly offset element 34 at the mid-length of bight portion 35 of a U-shaped spring member 36 straddling head 21 of frame 22. The member 36 may be formed of any suitable spring metal, but preferably is formed of phosphor bronze. Arms 37 of member 36 extend from head 21 upward along bellows 17, in radially outward spaced relation thereto. Each arm 37 is provided, adjacent its lower end, with a tab or tongue 38 struck inward therefrom and directed downward toward the head 21 of frame 22, providing, in effect, spring clips by means of which the spring member 36 may quickly be attached to head 21. By pressing the tongues 38 outward to clear the upper edge of head 21, spring member 36 may readily be detached therefrom. As will be clear from Figures 4 and 5, the tongues 38 normally contact the upper edge of head 21 of frame 22 and cooperate therewith to restrain member 36 against relative downward movement, element 34 of member 36 cooperating with element 33 of head 21 to restrain member 36 against relative upward movement.

Each arm 37 is provided with an element 40 extending from its upper end at an inclination radially inward of the bellows head 16 and normally overlying the latter. A terminal element 41, substantially parallel with arm 37, extends upward from the upper end of the inclined element 40. The elements 40 and 41 of each of the arms 37 have pressed outwardly thereof a channel element 42 of a width and a depth to snugly receive one of the ears 19 of bellows head 16, with the outer wall of the channel 42 bearing against the outer face of ear 19. The arms 37 are of such length that, when valve member 12 is in closed position, the inclined surfaces presented by the elements 40 are in contact with two diametrically opposite ears 19 of bellows head 16, adjacent the juncture between the upper end of arm 37 and element 40. The elements 40 then exert downward pressure on head 16 urging the valve member 12 toward its seat and supplementing the action of the bellows in holding the valve member closed. The spring member 36 is so designed that the resistance thereby to opening of the valve is of proper value to assure that the valve will not start opening until the temperature of the coolant has attained the desired value. For example, the resistance of member 36 is such that the valve will not start opening until the coolant reaches a temperature of from 165° to 170°. Thereafter, as the temperature of the coolant increases, the bellows 17 expands and continues to move valve member 12 in opening direction. After the valve has been opened to a predetermined extent, the ears 19 of bellows head 16 pass beyond the upper ends of inclined elements 40 of arms 37, thereby eliminating the resistance to opening of the valve offered by elements 40. Thereafter, but relatively slight resistance is offered to opening of the valve, by the elements 41, so that the bellows 17 may then readily move the valve to its fully opened position shown in Figure 5. That permits of the valve being fully opened by the bellows at a temperature of approximately 190°. It will be seen that by applying the spring member 36 to the standard valve assembly unit, the start opening temperature of the valve is raised from approximately 158° to 163°, to approximately 165° to 170°, and the temperature at which the valve is fully opened remains the same as in the standard valve assembly, that is, approximately 190°. That is advantageous in that the valve assembly is conditioned for cold weather operation, or for operation under conditions requiring that the valve start opening at a somewhat higher temperature than occurs in the standard valve assembly unit, but is moved to fully opened position at the same temperature as in the standard unit, whereby objectionable heating of the engine under warm or summer conditions of operation is avoided. Further, in the event the bellows be broken or ruptured, the expansion force of the bellows plus the pump pressure exerted on the coolant, will open the valve sufficiently for the bellows head 16 to clear the inclined elements 40 of arms 37, after which the valve is moved to its opened position permitting free flow of coolant to the radiator. Assurance is thus had that in the event of breakage or rupture of the thermostatic bellows the valve will be opened. That avoids risk of objectionable overheating of the engine and preserves the safe failure factor or condition previously referred to.

As previously noted, the body 18 of the thermostatic bellows 17 is formed of relatively thin metal and the bellows head 16 is formed of metal much thicker than that of the bellows body. By having the inclined elements 40 of arms 37 contact head 16 of the bellows 17, any wear which may occur due to rubbing contact between these members is taken by head 16 and elements 40 and 41. That is of importance, since the thin metal of the body of the bellows would soon wear through if subjected to appreciable rubbing contact under pressure. Preferably, as above noted, the ears 19 of bellows head 16 contact the outer or bottom walls of channel elements 42 and fit snugly therein. The ears 19 thus cooperate with the channel elements 42 for restraining the spring member 36 against turning movement relative to head 21 of frame 22 and assist in maintaining spring member 36 properly positioned about head 21 and bellows 17.

It will be understood that changes in details of my invention may be resorted to without departing from the field and scope thereof, and I intend to include all such variations, as fall within the scope of the appended claims, in this application in which the preferred form only of my invention has been disclosed.

I claim:

1. In thermostatic valve means for controlling the flow of cooling liquid for an internal combustion engine, a valve seat member, a valve member cooperating with said seat member, a supporting frame secured to said seat member depending therefrom, a thermostatic bellows underlying said valve member secured at one end to said frame having at its other end a head connected to said valve member, said bellows holding said valve member closed at a predetermined low temperature and urging it in opening direction at a higher temperature, and means comprising inclined surfaces converging inwardly of said head normally yieldingly held in contact with the peripheral area thereof urging said head in valve closing direction, said inclined surfaces being of limited extent such that said head passes out of contact therewith when it has moved a predetermined distance in valve opening direction thereby eliminating resistance by said inclined surfaces to continued movement of said head in the latter direction.

2. In thermostatic valve means for controlling the flow of cooling liquid for an internal combustion engine, a valve seat member, a valve member cooperating with said seat member, a supporting frame secured to said seat member depending therefrom, a thermostatic bellows underlying said valve member secured at its lower end to said frame having at its upper end a head connected to said valve member, said bellows holding said valve member closed at a predetermined low temperature and urging it in opening direction at a higher temperature, and a member straddling the lower end of and secured to said frame, said member comprising spring arms extending upward along said bellows and having inbent portions providing inclined surfaces converging inwardly of said head normally yieldingly held in contact with the peripheral area thereof urging said head in valve closing direction, said arms being clear of said bellows below said head, said inclined surfaces being of limited extent such that said head passes out of contact therewith when it has moved a predetermined distance in valve opening direction thereby eliminating resistance by said inclined surfaces to continued movement of said head in the latter direction.

3. In thermostatic valve means for controlling the flow of cooling liquid for an internal combustion engine, a valve seat member, a valve member cooperating with said seat member, a supporting frame secured to said seat member depending therefrom, a thermostatic bellows underlying said valve member having at its upper end a head connected thereto and secured at its lower end to said frame, said head having wear resistant elements extending radially outward beyond the top most fold of said bellows, said bellows holding said valve member closed at a predetermined low temperature and urging it in opening direction at a higher temperature, and spring arms secured to said frame extending upward along said bellows having portions presenting inclined surfaces converging inward of said head normally yieldingly held in contact with said elements urging said head in valve closing direction, said inclined elements being of limited extent such that said elements of said head pass out of contacmt therewith when it has moved a predetermined distance in valve opening direction thereby eliminating resistance by said inclined surfaces to continued movement of said head in the latter direction.

4. In thermostatic valve means for controlling the flow of cooling liquid for an internal combustion engine, a valve seat member, a valve member cooperating with said seat member, a supporting frame secured to said seat member depending therefrom having at its lower end a head provided with a central depression, a thermostatic bellows underlying said valve member secured at its lower end to said head having at its upper end a head connected to said valve member, said bellows holding said valve member closed at a predetermined low temperature and urging it in opening direction at a higher temprature, and a resilient U-member straddling the head of said frame restrained against relative downward movement with its arms extending upward along said bellows and spaced radially outward therefrom, said upper head having ears extending radially outward therefrom about the top fold of said bellows, the arms of said U-member respectively having inclined intermediate elements extending from their upper ends and terminal elements extending from the upper ends of said intermediate elements substantially parallel with said arms, said inclined elements overlying said upper head converging inward thereof and yieldingly resisting upward movement of said upper head during a predetermined portion only of such movement, said inclined elements and terminal elements having inwardly opening channels receiving certain of said ears with the latter contacting the bottoms of the channels and in cooperation therewith restraining said U-member against turning movement relative to said bellows.

5. In thermostatic valve means for controlling the flow of cooling liquid for an internal combustion engine, a valve seat member, a valve member cooperating with said seat member, a supporting frame secured to said seat member depending therefrom, a thermostatic bellows underlying said valve member secured at its lower end to said frame and having at its upper end a head connected to said valve, and spring arms secured to said frame spaced radially outward from said head having inclined elements normally overlying and converging inwardly of said head yieldingly resisting upward movement thereof during a predetermined portion only of such movement.

6. A spring member intended for application to a thermostatic bellows secured at one end to a supporting frame and having a head at its other end, said member being of substantially U-shape comprising a bight portion and arms extending therefrom substantially perpendicular to said bight portion and spaced apart throughout their length for insertion of a thermostatic bellows endwise between them, the free end portions of said arms being formed to provide inclined inwardly converging intermediate elements and terminal elements extending from said intermediate elements substantially parallel to said arms, the latter having clip elements struck inward therefrom adjacent and directed toward the bight portion of said member.

7. A spring member intended for application to a thermostatic bellows secured at one end to a supporting frame and having a head at its other end, said member being of substantially U-shape and comprising a bight portion and arms extending therefrom with the free end portions of its arms formed to provide inclined inwardly converging intermediate elements and terminal elements extending from said intermediate elements substantially parallel to said arms, the latter having clip elements struck inward therefrom adjacent and directed toward the bight portion of said member, said intermediate and terminal elements being pressed out at their central areas providing therein inwardly opening lengthwise channel elements.

WALTER A. CURTIS.

REFERENCES CITED

The following references are of record in the file of this patent:

(Other references on following page)

UNITED STATES PATENTS

| Number | Name | Date |
|---|---|---|
| 805,720 | Fulton | Nov. 28, 1905 |
| 1,934,548 | Kellog | Nov. 7, 1933 |
| 1,982,706 | Teetor | Dec. 4, 1934 |
| 2,168,999 | Macdonald | Aug. 8, 1939 |
| 2,255,543 | Fisher | Sept. 9, 1941 |
| 2,336,858 | Giesler | Dec. 14, 1943 |

FOREIGN PATENTS

| Number | Country | Date |
|---|---|---|
| 44,503 | Sweden | Sept. 4, 1918 |